Dec. 12, 1961  R. H. SHEPPARD  3,012,543
TRACTOR POWER STEERING WITH STRENGTHENED PARTS
Filed May 14, 1957  2 Sheets-Sheet 2
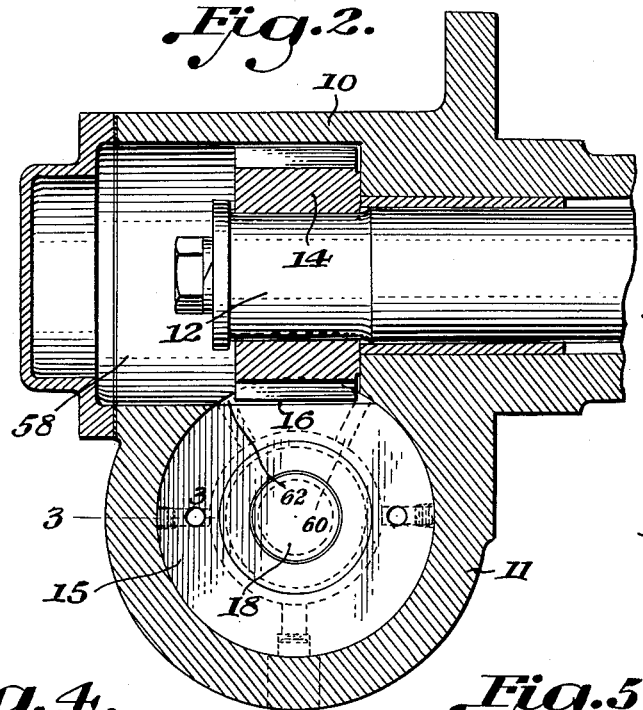
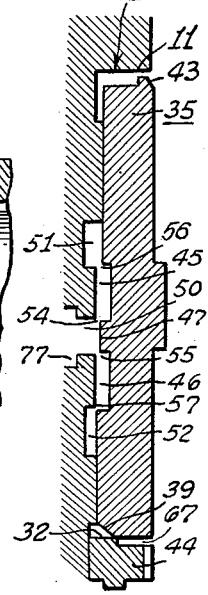
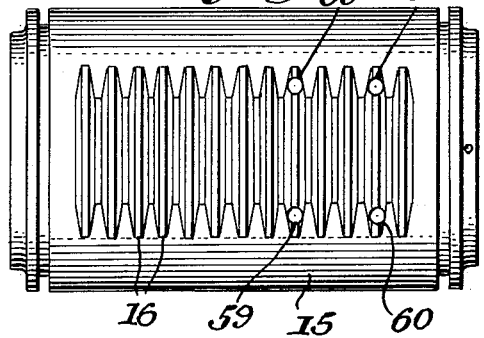
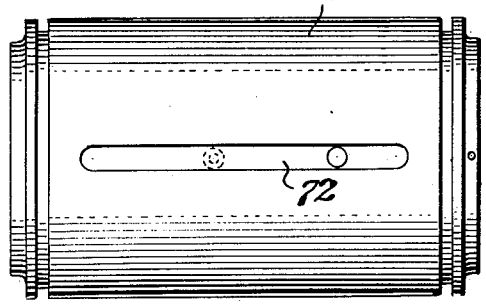
INVENTOR.
R.H. Sheppard,
BY Henry H Snelling
ATTY.

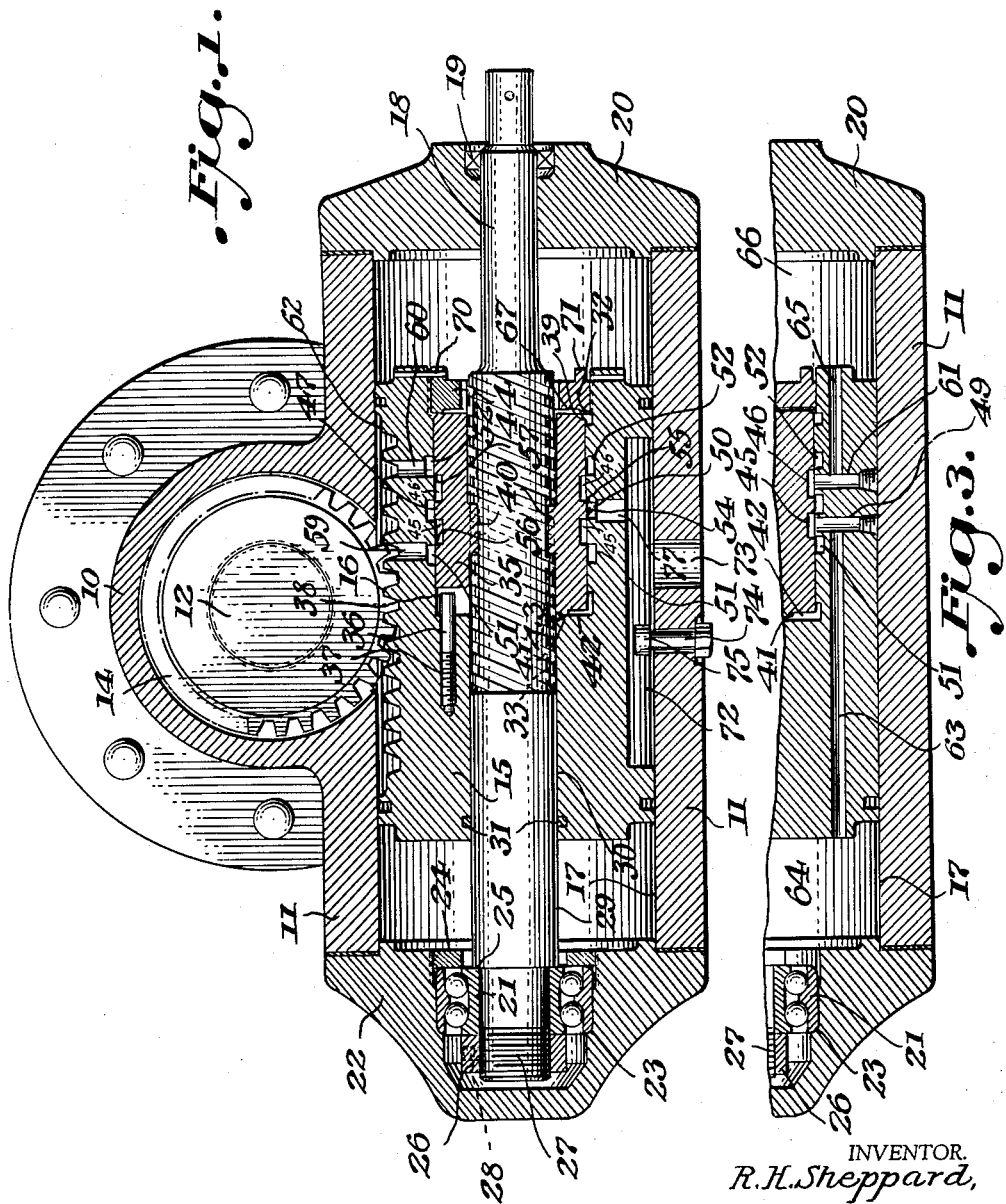

United States Patent Office 3,012,543
Patented Dec. 12, 1961

3,012,543
TRACTOR POWER STEERING WITH
STRENGTHENED PARTS
Richard H. Sheppard, 101 Philadelphia St., Hanover, Pa.
Filed May 14, 1957, Ser. No. 659,090
11 Claims. (Cl. 121—41)

This invention relates to power steering gears and has for its principal object the provision of a steering gear in which many parts of previous equipment have been eliminated with the result that the remaining parts may be made larger and stronger, thus providing for greater ease of manufacture with increased accuracy.

A further object of the invention is to design the distributing valve of a power steering mechanism so as to minimize friction and to insure accurate distribution of the power fluid operating on the piston which controls movement of the power steering shaft.

In the drawings:

FIGURE 1 is a plan view partly in horizontal section through the center line of the actuating shaft.

FIGURE 2 is a vertical section centrally through FIGURE 1.

FIGURE 3 is a fragmentary vertical section taken on line 3—3 of FIGURE 2.

FIGURE 4 is an end view of the piston.

FIGURE 5 is a side view of the piston.

FIGURE 6 is a view of the piston from the opposite side.

FIGURE 7 is an enlarged section of the bottom or nearer side of the valve as seen in FIGURE 1 with the size of the cracks exaggerated.

The housing 10 carries the vertically positioned power shaft 12 to one side of cylinder 11 which shaft at its lower end has suitable connections of any well-known type to the steering wheels of the vehicle which in the embodiment illustrated is a tractor. At its upper end the power shaft 12 carries a pinion 14 which is rotated by rack 16 of piston 15 which slides in bore 17 of cylinder 11 which is part of the housing 10.

The actuating shaft 18 rotates freely in the housing, having a bearing 19 in one cap 20 and being supported in a roller or ballbearing 21 in the opposite cap 22 of the housing. The ballbearing is locked against shoulder 23 by a ring 24. Axial movement of shaft 18 is prevented as shoulder 25 engages bearing 21 on one side and locking ring 26 engages it on the other side. This ring has threaded engagement with a reduced end 27 of shaft 18 and is locked in place by set screw 28. Shaft 18 has a smooth portion 29 engaging internal bore 30 of the piston and an internal contracting ring 31 rides on portion 29 of the shaft.

The actuating shaft 18 is threaded as at 33 to shift a valve 35 which may move axially of both the piston 15 and the actuating shaft 18 but which is held against rotation by a pin 36 fitted into the piston as at 37 and projecting about ⅜" to engage snugly a radial slot 38 in valve 35. Pin 36 is preferably hollow to facilitate pressing it into the reamed hole 37 and to avoid any possible distortion of the piston as might occur by displacement of metal if a solid pin were used. Valve 35 has an inwardly extending annular portion 40 having a 29° Acme thread of four threads per inch meshing with the threads 33 on the steering shaft 18, rotation of which causes the valve 35 to move axially an extremely short distance as the annular surface 41 of the valve engages the wall 42 of the piston at one end of its travel and the valve engages an adjusting nut 44 at the other end of its travel so that the valve may travel only about a thirty-secondth of an inch in a 9¼" by 5½" diameter piston sliding on an inch and three quarters actuating shaft. To lessen the area of annular end contact the valve is chamfered as at 43. A similar chamfer 39 at the other end serves the same purpose adjacent the wall 32 of the nut 44, this wall being recessed as at 67 to make the zone of contact about a sixteenth of an inch in radial dimension, the same as the zone or surface 41 which touches the solid wall 42. Although there is no backlash, it can be introduced if desired by increasing the width of groove 50 with respect to the land 47 between the two annular grooves 45 and 46 in the valve 35, and by increasing the widths of cracks 56 and 57 when the valve 35 is in neutral position.

Annular grooves 50, 51 and 52 are cut in the interior wall of the piston to cooperate with annular grooves 45 and 46 in the outer surface of the valve, groove 50 being very slightly wider than land 47 thus providing small cracks 54 and 55 between groove 50 in the piston and grooves 45 and 46 in the valve when the parts are in neutral position. These grooves are about an eighth of an inch deep and have smooth sharp corners with a maximum radius of less than a thousandth of an inch. The cracks are from .005" to .009", preferably about .007". The grooves 45 and 46 are likewise of such width that similar annular cracks 56 and 57 are formed by the grooves 45 and 51 and 46 and 52 respectively when the valve is in neutral position. Groove 51 communicates with the reservoir 58 through a radial passageway 59, preferably a dual passageway discharging on both sides of the pinion 14. Groove 52 communicates through a similar dual radial passageway 60, as best seen in FIGURE 2, leading to the reservoir through a space 62 to one side of the rack teeth 16.

As best seen in FIGURE 3, groove 45 in valve 35 communicates through radial bore 49 in the piston with an elongated longitudinal passageway 63 leading to pressure chamber 64 at one end of the piston, and groove 46 communicates through radial bore 61 with a similar but much shorter passageway 65 with pressure chamber 66 at the opposite end of the cylinder 11.

At the right or adjusting nut side of the piston there are two diametrically opposite bores 68 and 69 which frictionally hold a nut positioning pin 70 which is placed in one or the other of these holes and which engages between any two of the lugs 71 on the finely threaded adjusting nut 44. The number of lugs 71 is an uneven number (see FIGURE 4), preferably twenty-five, and they are equally spaced so as to provide with the fine threads an extremely exact adjustment of the nut 44 which takes the place of the pair of adjusting screws previously used.

Referring now to FIGURES 1 and 6, there is an elongated recess 72 in the side of the piston 15 opposite the rack teeth 16. This recess serves a dual purpose: first, it is the distributing passageway for the hydraulic fluid, preferably oil, which enters through port 73 from the pressure side of the pump (not shown); and second, it is a convenient means for preventing rotation of the piston 15. This is accomplished by securing stud 74 in the cylinder portion 11 of housing 10 and mounting a roller 75 on this stud to snugly fit the parallel walls of recess 72. Roller 75 by preventing rotation of piston 15 constantly maintains alinement of rack 16 with its meshing pinion 14 on power steering shaft 12. The single elongated recess 72 may thus replace the two grooves previously utilized for this purpose as inlet port 73 in the housing is offset with respect to radial port 77 in the piston so that roller 75 can never interfere with flow of the hydraulic fluid through port 77 to annular entry groove 50. The diameter of shaft 18 is controlled by the size of shoulder 25, as required by the bearing 21 which must be of adequate size; hence the simplification of the screw over previous practice permits the use of only one thread rather than one at each end of the shaft.

The operation is as follows: In the normal position shown in all of the figures, hydraulic fluid under pressure enters port 73 at the bottom of FIGURE 1 and fills guiding recess 72 from which it passes through the short radial port 77 to central annular groove 50 in piston 15. Because of the small cracks 54 and 55 on both sides of the land 47 on the valve this oil will pass to grooves 45 and 46 in valve 35 and from there through two cracks 56 and 57 on the outsides of grooves 45 and 46 to grooves 51 and 52 in the piston and will then pass simultaneously through dual passageways 59 and 60 to the reservoir 58 from which through suction pipes, not shown, the fluid is returned to the usual pump.

Should the steering wheel of the tractor be turned, however, actuating shaft 18 will be rotated and some of these cracks will be closed and others opened still wider. We will assume that the turn is made in a direction to displace valve 35 to the left as seen in FIGURE 1 and upward in FIGURE 7. This will close crack 54 at one side of central groove 50 in the piston but will open crack 55 still wider. At the same time crack 57 will be closed and crack 56 at the other side opened still wider. This slight movement causes a hydraulic flow from groove 46 (FIGURE 3) via passageways 61 and 65 into pressure chamber 66 at the right end of this piston 15 where it acts on the adjusting screw side of the piston forcing the piston to the left. As the piston so travels it confines the oil in pressure chamber 64 but this oil escapes through elongated passageway 63 into groove 45, and through crack 56 into groove 51 and out via dual passageway 59. This motion of the piston 15 continues as long as the operator of the vehicle continues to turn shaft 18. As soon as shaft 18 is held steady, the piston 15 will instantly center itself on the valve 35 in spite of the strong urge of pinion 14 to move it axially and the pressure in the hydraulic line drops to twenty or thirty pounds.

What I claim is:

1. Power steering mechanism for a vehicle comprising a housing having a reservoir and a cylindrical bore communicating with said reservoir, a rack-carrying piston slidable in said cylinder, a rotatable actuating shaft coaxially of the cylinder, means for preventing axial movement of said shaft, an annular valve with spaced annular grooves on its outer surface slidable in the piston and having threaded engagement with the actuating shaft, means for preventing rotation of the piston, means for preventing rotation of the valve, a power steering shaft, a pinion on the power shaft driven by said rack with the spaces between its teeth in communication with the reservoir, said piston having spaced annular grooves on an internal cylindrical surface and radial passageways communicating with the grooves to convey fluid under pressure to the rack, the pinion and said reservoir, and additional passageways in the piston for conveying fluid selectively from an annular groove in the valve to the proximate end of the cylinder.

2. The device of claim 1 in which the means for preventing rotation of the valve comprises a radial slot in the valve and a hollow pin secured in the piston and snugly engaging said slot, whereby the hollow pin avoids distortion of the piston as might occur with a solid pin when heated.

3. In a power steering mechanism of the type in which a power driven piston carrying a rack for driving the power steering shaft is controlled by an annular valve sliding within the piston: means for limiting axial movement of the valve with respect to the pinion including an adjusting nut within the piston to limit movement of the valve in one direction, said nut having a plurality of spaced lugs evenly positioned around its periphery to form a series of radial slots and being of an uneven number, a pair of diametrically opposed bores in the piston, and a pin having a frictional fit in either of the bores to engage snugly the radial slot between a chosen pair of said lugs.

4. The device of claim 1 in which the means to prevent rotation of the piston includes a roller carried by the housing and projecting into a longitudinal recess in the piston, said recess communicating with a radial bore in the piston and with an entry port in the housing.

5. The device of claim 4 in which the radial port is offset with respect to the entry port so that the roller never interferes with flow through the entry port.

6. In a power steering mechanism, a piston having a cylindrical recess therein, one face of which is normal to the axis of the piston, an annular valve slidable in said recess, a rotatable actuating shaft having a threaded engagement with the valve to reciprocate the valve as the shaft is rotated, and an adjusting ring nut carried by the said piston for limiting axial movement of the valve, said valve having an annular rib with a radial width of less than $\frac{1}{32}''$ extending from its end face proximate the face of the recess, the inner face of the nut having a central annular groove leaving an annular rib proximate the valve end to engage the proximate outer plane face of the valve whereby to minimize the contact area on both ends of the valve to lessen the effort required to change direction of rotation of the actuating shaft.

7. In a power steering mechanism for a vehicle of the type in which the ground engaging steering wheels are power operated through a pinion meshing with a rack of a piston moving in a cylinder and controlled by sliding of a valve moved axially by rotation of an actuating shaft connected to the steering wheel of the vehicle: a housing having a pair of manually interchangeable caps forming the ends of said cylinder, said actuating shaft extending completely through the cylinder and having a bearing in each cap, said piston sliding on the actuating shaft and said valve directly engaging both the piston and the shaft, whereby the piston, valve and actuating shaft may be placed either right or left of the pinion connected to the steering wheels.

8. The mechanism of claim 3 in which said two bores are open at both ends and the radial length of each bore is less than the distance from the inner open end of the bore to the inner margin of the annular valve so that the pin can be removed by driving it toward the axis of the piston so that it may then readily be pulled from between the lugs.

9. In a power steering mechanism of the type having an actuating shaft, a piston coaxial of and sliding directly on the actuating shaft, and an axially movable annular valve between the piston and the actuating shaft and sliding in an annular recess in the piston, one wall of which recess forms one limit of movement of the valve by engagement with the proximate end wall of the valve, means for minimizing the contact between said proximate end wall of the valve and the piston, said means comprising a recess in the wall of the valve, said latter mentioned recess having a cylindrical face close to and coaxial with the surface of the valve in contact with the actuating shaft and an annular plane surface parallel to the proximate end face of the piston, and an annular chamfer at an inner circular corner of the valve, leaving a flat annular surface to engage the piston end wall, said surface having a radial dimension of less than $\frac{1}{32}''$.

10. The mechanism of claim 9 in which the piston has an annular groove at said proximate end of the valve extending completely around the valve so that the annular spaced formed by the groove and the recess at this point is L-shaped in cross section.

11. In a power steering mechanism for tractors, an actuating shaft, a piston coaxial of and sliding on said shaft, an axially moving annular valve between the piston and the shaft with one end having its outer circular edge chamfered and an annular adjusting ring engaging said one end, the end face of said ring being annularly recessed proximate the chamfer so that the annular zone of contact between the ring and the valve is less than $\frac{1}{32}''$ in radial dimension, whereby end contact of the valve with the annular ring is minimized, thus making it easier to alter the direction of rotation of the actuating shaft.

References Cited in the file of this patent

UNITED STATES PATENTS

| | | |
|---|---|---|
| 1,790,620 | Davis | Jan. 27, 1931 |
| 1,937,470 | Davis | Nov. 28, 1933 |
| 1,937,485 | Davis | Nov. 28, 1933 |
| 2,528,901 | Morse | Nov. 7, 1950 |
| 2,722,199 | Blanchette et al. | Nov. 1, 1955 |
| 2,746,426 | Gardiner | May 22, 1956 |
| 2,788,770 | Folkerts | Apr. 16, 1957 |
| 2,830,461 | Sheppard | Apr. 15, 1958 |